US006375362B1

(12) United States Patent
Heiles et al.

(10) Patent No.: US 6,375,362 B1
(45) Date of Patent: Apr. 23, 2002

(54) OPTICAL PLUG-TYPE CONNECTION

(75) Inventors: Juergen Heiles, Munich; Hubert Jaeger, Pullach; Detlef Stoll; Patrick Leisching, both of Munich; Harald Bock, Augsburg; Alexander Richter, Munich, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/564,231

(22) Filed: May 4, 2000

(30) Foreign Application Priority Data

May 4, 1999 (DE) .......................................... 199 20 452
Feb. 17, 2000 (DE) .......................................... 100 07 172

(51) Int. Cl.⁷ ................................................ G02B 6/38
(52) U.S. Cl. ......................... 385/75; 385/55; 385/135; 385/139; 385/56; 385/58
(58) Field of Search ............................ 385/57, 62, 69, 385/70, 75, 81, 101, 135, 56, 83, 84

(56) References Cited

U.S. PATENT DOCUMENTS 4,923,272 A * 5/1990 Cuda ........................... 385/55
5,109,452 A * 4/1992 Selvin .......................... 385/69
5,337,400 A 8/1994 Morin et al.
5,394,503 A * 2/1995 Dietz .......................... 385/135
5,764,043 A 6/1998 Czosnowski et al.

FOREIGN PATENT DOCUMENTS

EP 0 466 276 1/1992

* cited by examiner

Primary Examiner—Brian Healy
Assistant Examiner—Kevin S Wood
(74) Attorney, Agent, or Firm—Schiff Hardin & Waite (57) ABSTRACT

In an optical plug-type connection between two optical conductors having an optical terminal which receives an optical plug-type member, an electrical connection is provided for verifying that the optical plug-type connection has been made and/or released. This verification reduces the likelihood of an optical plug-type connection being erroneously acquired in the network management system and, thus, significantly reduces problems in locating errors in the optical communication system.

13 Claims, 6 Drawing Sheets

OPTICAL PLUG-TYPE CONNECTION

BACKGROUND OF THE INVENTION

The present invention is directed to an optical plug-type connection between two optical conductors having an optical terminal and a method for plugging and unplugging the optical plug-type connection.

In optical communication or transmission systems, particularly in communication systems that operate according to the Wavelength Division Mutliplexing principle, optical connections are manually through-connected in optical network elements and in switching networks, for example, For this purpose, two optical conductors having an optical terminal are connected to one another via an optical plug-type connection, whereby the optical plug-type connection comprises an optical connecting conductor and two optical plug elements that are respectively attached to the ends of the optical connecting conductor. The optical plug elements of the optical connecting plug are plugged into optical terminals of the conductors to be connected, so that an optical connection between a first optical conductor and a second optical conductor is created. In addition, the configuration of the optical plug-type connection, for example the number of first and second optical conductors that are respectively allocated to an optical terminal, which optical conductors are connected via the optical plug-type connection, is made available to a network management system in the form of parameters. The existing configuration of the optical plug-type connection, with the aid of the data present in the network management system, can now be visualized or indicated with a display unit. When the network management system displays a line break of the first optical conductor, the network management system also infers a breakdown or failure of the optical connection due to the optical connection of the first and second optical conductors existing via the optical plug-type connection.

However, errors can occur when parameters, which indicate an existing plug-type connection or, respectively, the configuration of a network element, are manually entered into a data bank of the network management system., For example, because of an error in the manual entry, the network management system displays a configuration of the network element that does not correspond to reality. The likelihood of such an erroneous configuration specification is extremely high in heretofore realized communication systems due to the complexity of the wavelength division multiplexing communication system, for example considerable plurality of communication channels, so that the error localization is extremely involved and is partially associated with a high economic outlay in the case of an erroneous configuration of the network elements. For purposes of reducing the above-mentioned likelihood of manual, erroneous configuration, methods are known for providing an optical channel for purposes of transmitting configuration data to the network management system, wherein the realization of such a method in an optical communication system is extremely cost-ineffective and an economical handling of the communication systems that are fashioned in this way is difficult to realize as a result thereof.

In addition, errors can occur when the user manually plugs or releases an optical plug-type connection. This leads to an erroneous forwarding of a signal that can no longer be evaluated at the receiver location.

SUMMARY OF THE INVENTION

The present invention is based on the object of providing an optical plug-type connection of the above-mentioned type, upon which the likelihood of a configuration that is erroneously readjusted in the network management system is reduced. Another object of the invention is to provide an optical plug-type connection of the above-mentioned type so that the likelihood of a user erroneously plugging or releasing an optical plug-type connection is almost impossible.

These objects are inventively achieved by means of an optical plug-type connection wherein, in addition to the optical connection, an electrical connection is provided for the verification of the optical plug-type connection and wherein the configuration of the optical plug-type connection is visualized or indicated with the aid of the electrical connection in the optical network element and/or network management system. Due to the additional electrical connection, the network management system is advantageously informed of the configuration of the optical plug-type connection immediately when the optical connection is created, for example the most current configuration data, almost at the same time at which the optical connection is created, are already available to the network management system for the purpose of evaluating or, respectively, assessing. Thus, the likelihood of an erroneous manual input of the parameters of the existing plug configurations into the management system is avoided in a particularly advantageous way. Therefore, the data for the representation by the network management system are provided by the optical communication system itself, as a result whereof the economic outlay expended in storing the configuration data is significantly reduced. In addition, the configuration of the network element that is remotely arranged from the network management is enabled in an advantageous way. Over and above this, a locking mechanism is provided that locks the optical plug-type connection immediately after the creation or immediately before the releasing in order to avoid an erroneous connection. Preferably, the locking mechanism also locks all of the plug-type connections that, however, are free but which are not to be plugged at that moment. It thus prevents a user from creating a connection that is not desired.

In a further advantageous exemplary embodiment of the present invention, the optical plug-type connection is flexibly fashioned as an optical trunk line. Therefore, it is advantageously possible to create an optical connection between arbitrary plug-type connections. Preferably, the optical plug-type connection is fashioned as an optical plug-type connection. Thereby, a connection between the optical terminals, which are exactly defined in terms of location, can be advantageously created due to the fixed form of the plug-type connection, so that the danger of an erroneous connection is further reduced as a result thereof.

Preferably, a configuration signal is transmitted in the further exemplary embodiment for the purpose of determining the configuration status. The transmission of the configuration signal is ensured by means for transmitting a configuration signal. Preferably, means for transmitting a digital configuration signal is an electrical sheath wired to the optical fiber. Most preferred as a means for purposes of transmitting a digital configuration signal are chip labels on both the plugs of the connecting cable with inventory data which contains the homogeneousness or integrity of the two plugs of the cable.

In a further preferred embodiment of the present invention, a control unit is provided for purposes of evaluating transmitted configuration signals or the non-transmitted configuration signals. The control unit evaluates the incoming configuration signals or the non-incoming configuration signals so that it acquires, stores and processes the signals. A central network element computer is preferably utilized as this control unit.

A particularly advantageous embodiment comprises means for the line-oriented concentration of the configuration signals for a plurality of optical conductors, which can be connected by means of a plurality of connecting plug-type connections. Preferably, means for a line-oriented concentration are microprocessors or time-division multiplexers. What is advantageous about the proposed arrangement is the lucidity of the inlets and outlets, as well as a reduced sensitivity with respect to electromagnetic immissions and emissions.

A further preferred embodiment provides a locking means. The opto-electrical terminal or optical electrical terminal can be preferably locked by means of this locking means, so that a plugging-in of an opto-electrical plug element is not possible. In addition, an optical electrical or opto-electrical plug element in the plugged-in state can be locked in the opto-electrical terminal by means of a locking means, so that a pull-out of the opto-electrical plug element is no longer possible. For example, the locking can occur by means of a radially narrowing circular element that is embedded, for example, in the circular recess of the opto-electrical plug element. A displacement mechanism is also imaginable that is fastened by a jack outside of the opto-electrical terminal or that is placed within a recess in the jack. In the first case, the recess of the opto-electrical plug element would not be necessary in order to lock the opto-electrical cable. The locking process could be initiated by means of an electromotor or a magnet, for example.

In another preferred embodiment, the locking process can be controlled by means of a central control unit. Thereby, a prescribed planned plug-type connection can be deposited in the control unit and can be processed following one another. For this purpose, all jacks or, respectively, ports of the plug-type connections can be locked and only the port that is to be plugged next is unlocked. Therefore, the user who changes the configuration can be further effectively prevented from creating a connection in an incorrect port. The already-prescribed configuration thus administered in the control unit can be a step-by-step process as a work plan without the user being able to incorrectly plug a terminal, since the incorrect ports will all be locked closed.

Preferably, a connection that is plugged in but is to be released or a connection that has not yet plugged in but is to be plugged in is indicated by means of an optical display, particularly an illuminated display LED. Therefore, this facilitates the plugging or, respectively releasing of a connection for the manual user, since he can now get the connection to be released or the connection to be made indicated.

A particularly preferred embodiment of the inventive method is that the locking means of the connection to be released or plugged in is opened and that the locking means of the connection to be released or plugged in is closed after the connection has been pulled or, respectively, formed. Therefore, cross-connects can be manually connected by unskilled employees, and error rates can be significantly reduced given the manual connecting.

In a further preferred method, the connection to be released or to be made in the cross-connect is displayed or indicated by means of an illuminated display LED. Thus, an interconnection to be released or formed is made visible at a cross-connect. Thus, it is considerably more simple for the user to recognize which connections are to be released or made at the cross-connect.

Other advantages and features of the invention will be readily apparent from the following description of the preferred embodiments, the drawings and claims.

DESCRIPTION OF THE PREFERRED EMBODIMENTS

Figure 1:
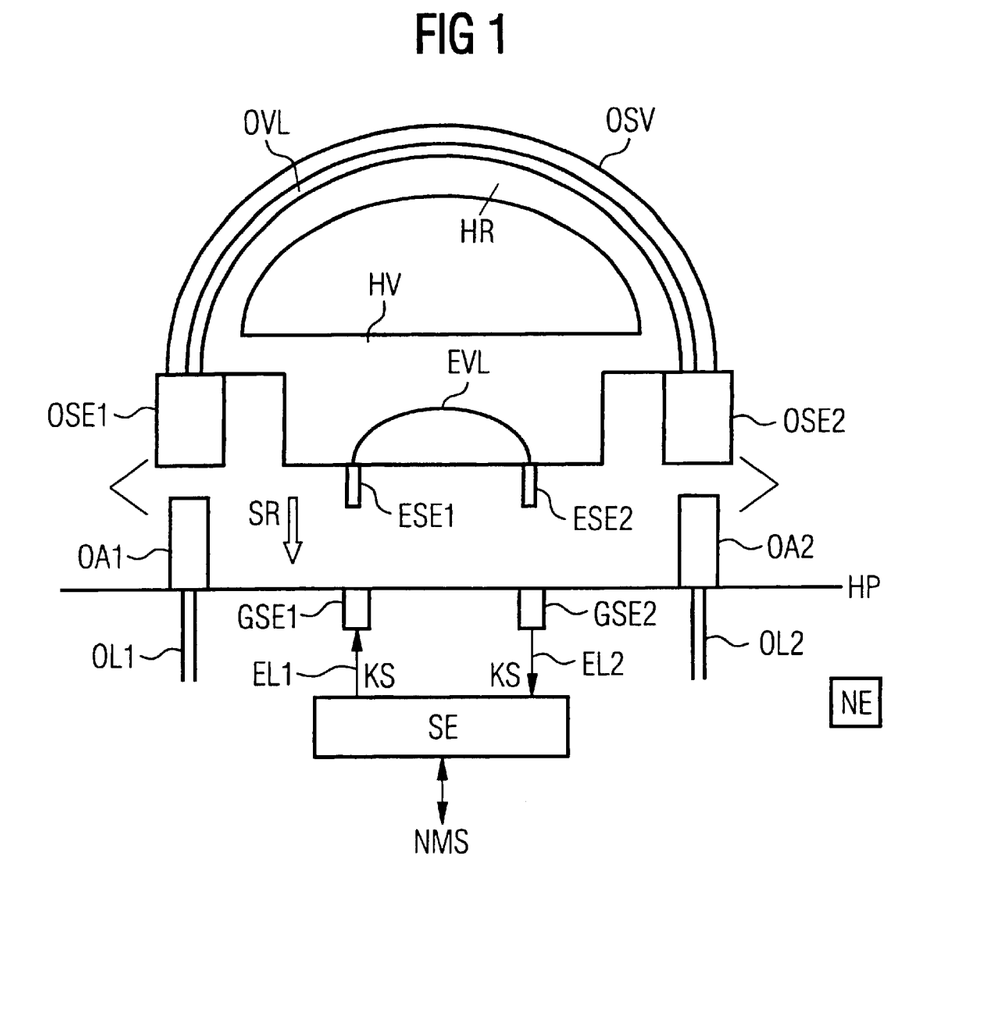
FIG. 1 is a schematic presentation of the basic structure of an optical plug-type device which is directly pluggable and has electrical plug elements.

The principles of the present invention are particulary useful when incorporated in an optical plug-type connection on the basis of an optical plug-type device OSV of FIG. 1, which is illustrated being used in an optical network element NE that comprises a holding plate HP and is a switching network. The optical plug-type device OSV comprises an optical connecting conductor OVL, first and second optical plug elements OSE1 and OSE2, as well as an electrical connecting conductor EVL having first and second electrical plug elements ESE1 and ESE2. The optical plug-type device OSV has a semi-circular ring-shaped portion or member HR, whose ends are connected by a rectangular crosspiece HV. The optical connecting conductor OVL is centrally arranged on the half-circular or semi-circular ring portion HR and extends from a first optical plug element OSE1 to a second optical plug element OSE2, wherein the first and second optical plug elements OSE1 and OSE2 are received in rectangular-shaped recesses formed in the lower left and lower right corners of the rectangular-shaped crosspiece HV. In the remaining crosspiece HV, the electrical connecting conductor EVL is guided, for example in a half-circle-shaped bend parallel to the optical connecting conductor OVL, with the ends of the electrical connecting conductor EVL being connected to the first and second electrical plugs ESE1 and ESE2, which are attached to the bottom side of the rectangular-shaped cross member HV.

A connection-individual counter piece of the optical plug-type connection are arranged on the holding plate HP of the network NE. For example, first and second optical terminals OA1 and OA2 are perpendicularly arranged on the top side or the terminal side of the holding plate HP. The holding plate HP, on the bottom side, has a first optical conductor OL1 connected to the first optical terminal OA1 and a second optical conductor OL2 is connected to the second optical terminal OA2. In an analogous way, first and second electrical cooperating plug elements GSE1 and GSE2 are provided in the holding plate HP and are perpendicularly arranged to the plane of this plate for the purpose of accepting the first and second electrical plug elements ESE1 and ESE2 of the electrical conductor EVL. A first electrical conductor EL1 is lead to the first electrical cooperating plug element GSE1 and a second electrical conductor EL2 is lead to the second electrical cooperating plug element GSE2. The first and second electrical conductors EL1 and EL2 are connected to a control unit SE which is arranged in the network element NE.

When the optical plug-type connection is created in a plug-in direction of the arrow SR with the aid of the optical conductor OSV, the first optical plug element OSE1 is connected to the first optical terminal OA1 and the second optical plug element OSE2 is connected to the second optical terminal OA2 so that an optical connection between the first optical conductor OL1 to the second optical conductor OL2 is made via the connecting conductor OVL. Approximately at the same time, the first electrical plug element ESE1 is plugged into the first electrical cooperating plug element GSE1 and the second electrical plug element ESE2 is plugged into the second electrical cooperating plug element GSE2. In addition to the optical plug-type connection, electrical connections via the first electrical conductor EL1 and the electrical connecting conductor EVL of the optical conductor OSV and the second electrical conductor EL2 is created, via which a configuration signal KS is transmitted from the control unit SE back to the control unit SE, and whether or not the configuration signal KS is present is evaluated in the control unit. In the form of parameters, the network management system NMS is informed of the information about the current configuration of the plug-type connection between the first and second optical conductors OF1 and OF2, namely whether the optical connection is made or not made, which information is calculated in the control unit SE on the basis of the evaluation of the configuration signal KS.

Figure 2:
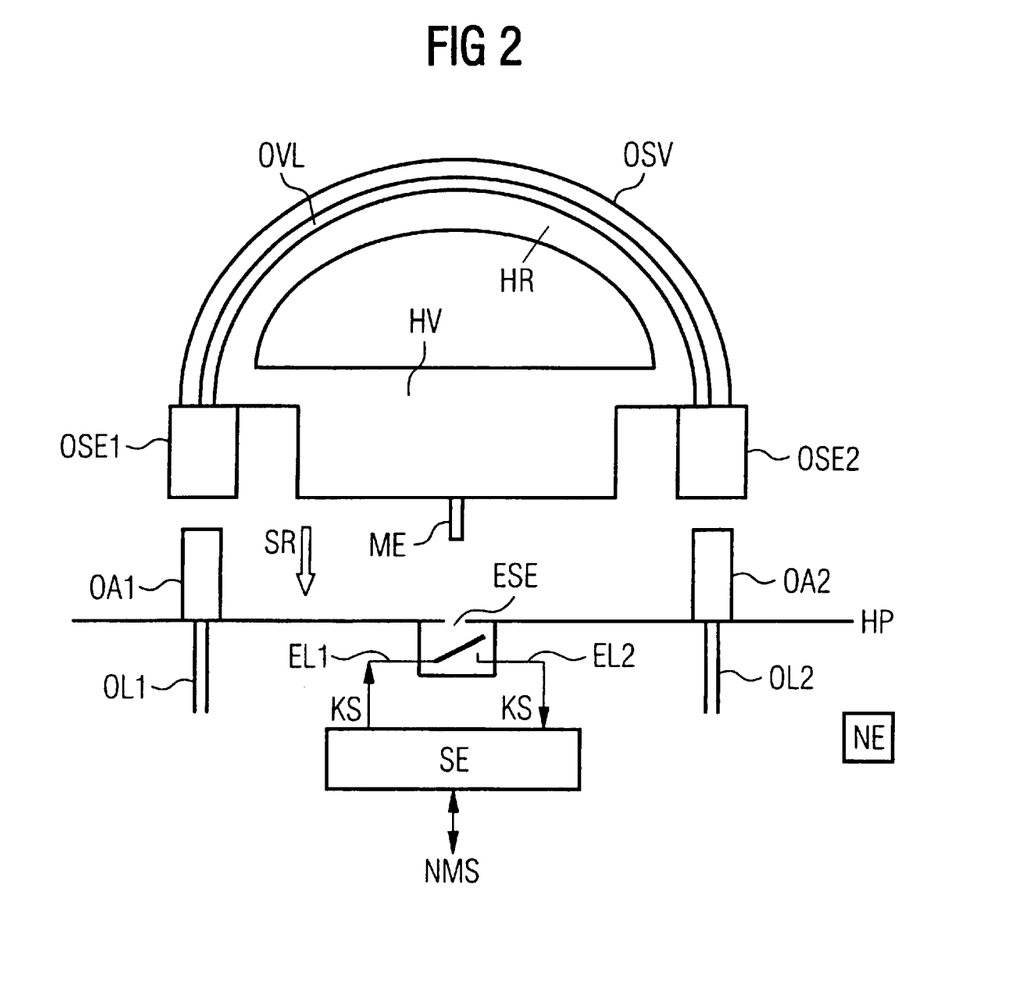
FIG. 2 is a diagrammatic view of a modification of the basic structure of the optical plug-type device which has an electrical switching element.

A modification of the inventive plug-type connection of FIG. 1 is shown in FIG. 2 and has only a single mechanical plug element ME instead of the first and second electrical plug elements ESE1 and ESE2. The first and second electrical cooperating plug elements GSE1 and GSE2, which were provided on the holding plate HP, and the electrical connecting conductor EVL, which connects the first and second electrical plug elements ESE1 and ESE2, are not present. Instead, an electrical switch element ESE is provided on the holding plate in the network element NE, and this switch element ESE connects the first electrical conductor EL1 to the second electrical conductor EL2. A recess or aperture is provided in the holding plate HP immediately above the switch point of the electrical switch element ESE for the purpose of accepting the mechanical plug element ME of the optical conductor. During formation of the optical connection, the electrical switching element ESE in the network NE is switched by means of the mechanical plug element ME and, for example, an electrical connection via the first electrical conductor EL1 and the second electrical conductor EL2 is thereby created. It is also possible that instead of creating the electrical connection between the electrical conductors EL1 and EL2, the switch is deactivated by the element ME to break or interrupt the connection between these two conductors. Given an existing electrical connection, the control element SE transmits the configuration signal KS to the control unit SE via the first and second electrical conductors EL1 and EL2, and the control unit SE evaluates whether or not the configuration signal is present and the network management system NMS is informed when the optical connection is formed.

Figure 3:
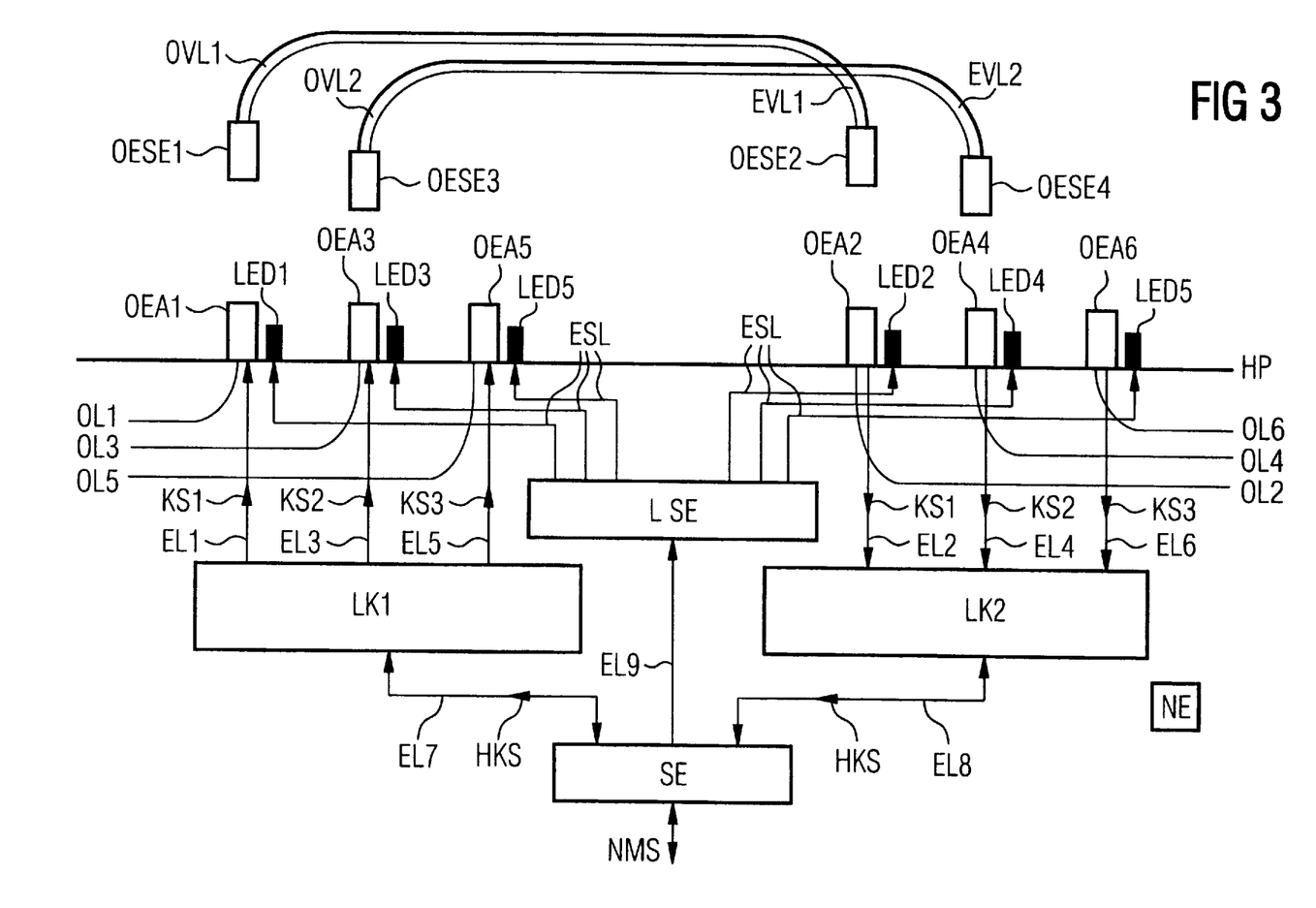
FIG. 3 is a schematic diagram of an optical plug-type connection system with electrical plug elements, a control unit and an optical signalization.

Another embodiment of the inventive optical plug-type connection on the basis of an optical plug connecting system is illustrated in FIG. 3 and comprises a plurality of optical plug-type connections with flexible optical connecting conductors OVL and, in addition to the control unit SE, includes an optical signaling unit LSE. In this Figure, first, second, third, fourth, fifth and sixth opto-electrical terminals OEA1–OEA6 are arranged on the top side of the holding plate HP, whereby, additionally parallel to the respective opto-electrical terminals OEA1–OEA6, a light-emitting diode is preferably provided, for example that first, second, third, fourth, fifth and sixth light-emitting diodes LED1–LED6 are arranged on the top side of the holding plate HP in order to display or indicate the operating status of the respective opto-electrical terminals OEA1–OEA6. In addition, first and second line orientated concentrators LK1 and LK2, an optical signaling unit or, respectively, a light-emitting diode control unit LSE and the control unit SE are provided in the network element NE. The first line-oriented concentrator LK1 is connected to the first opto-electrical terminal OEA1 via a first electrical conductor EL1 and is connected to the third opto-electrical terminal OEA3 via a third electrical conductor EL3 and is connected to the fifth opto-electrical terminal OEA5 via a fifth electrical conductor EL5. In a similar way, the second line-oriented concentrator LK2 is connected to the second opto-electrical terminal OEA2 via a second electrical conductor EL2 is connected to the fourth opto-electrical terminal OEA4 via a fourth electrical conductor EL4 and is connected to a sixth opto-electrical terminal OEA6 via a sixth electrical conductor EL6. In addition, the first line-oriented concentrator LK1 is connected to the control unit SE by a seventh electrical conductor EL7 and the second line-oriented concentrator LK2 is connected to the control unit SE via an eighth electrical conductor EL8. A ninth electrical conductor EL9 is guided from the control unit SE to the light-emitting diode control unit LSE, whereby the first, second, third, fourth, fifth and sixth light-emitting diodes LED1–LED6 are respectively connected to the light-emitting diode control unit LSE via electrical control lines ESL.

In a way similar to that of FIGS. 1 and 2, optical conductors OL1–OL6 are led to the opto-electrical terminals OEA1–OEA6. For example, the first optical conductor OL1 is led or connected to the first opto-electrical terminal OEA1, the second optical conductor OL2 is connected to the second opto-electrical terminal OEA2, the third optical conductor OL3 is connected to the third opto-electrical terminal OEA3, the fourth optical conductor OL4 is connected to the fourth opto-electrical terminal OEA4, the fifth optical conductor OL5 is connected to the fifth opto-electrical terminal OEA5, and the sixth optical conductor OL6 is connected to the sixth opto-electrical terminal OEA6.

For the purpose of creating the optical plug-type connection, first and second opto-electrical connecting conductors OVL1 and OVL2, for example, are provided, which additionally include first and second electrical connecting conductors EVL1 and EVL2 arranged respectively parallel to the optical connecting conductors OVL1 and OVL2 by being integrated into the optical trunk line OVL. For the purpose of creating the optical plug-type connection between the first and second opto-electrical terminals OA1 and OA2, for example, the opto-electrical plug elements OESE1–OESE4 are respectively provided on the ends of the opto-electrical connecting conductors OVL1 and OVL2. In particular, the first opto-electrical connecting conductor OVL1 has first and second opto-electrical plug elements OESE1 and OESE2, and the second opto-electrical connecting conductor OVL2 has third and fourth opto-electrical plug elements OESE3 and OESE4.

When an optical connection is to be created between the third optical conductor OL3 and the fourth optical conductor OL4, the third opto-electrical plug element OESE3 of the second opto-electrical connecting conductor OVL2 is then plugged into the third opto-electrical terminal OEA3 and the fourth opto-electrical plug element OESE4 is plugged into the fourth opto-electrical terminal OEA4. The optical connection is created as a result thereof. Approximately at the same time, a second configuration signal KS2, which, by means of line-oriented deconcentration, is acquired from a main configuration signal received by the control unit, is transmitted from the first line-oriented concentrator LK1 to the second line-oriented concentrator LK2 via the third electrical conductor EL3, the third opto-electrical terminal OEA3, the second electrical connecting conductor EVL2, the fourth opto-electrical terminal OEA4 and the fourth electrical conductor EL4. In the second line-oriented concentrator LK2, the received second configuration signal KS2, together with the first and third configuration signals KS1 and KS3, for example in a line-oriented fashion, are concentrated to a main configuration signal HKS and the concentrated main configuration signal HKS is transmitted to the control unit SE via the eighth electrical conductor EL8. The control unit SE evaluates the first, second and third configuration signals KS1, KS2 and KS3 and the light-emitting diode control unit LSE is actuated on the basis of the information acquired by means of the evaluation. In dependency on the control commands received by the control unit SE, the light-emitting diode control unit LSE, in turn, switches the light-emitting diodes LED1–LED6, for example, on or off or, respectively, green or red. For this purpose, different switching-oriented realizations can be imagined, for example the visualization of the switched optical plug-type connections is, by no means, limited to the providing of light-emitting diodes LED1–LED6, but can also occur by means of other opto-acoustic display or indicating means.

In addition to the ON/OFF-information acquired by means of the configuration signals KS1–KS6, what are referred to as "identifiers" can also be transferred to the control unit SE via the optical connections with the aid of the allocated numbers, for purposes of identifying the individual opto-electrical terminals OEA1–OEA6, and the control unit SE transmits the information, particularly identifiers, to the network management system again, as in the arrangements of FIGS. 1 and 2. Therefore, the network management system always receives the most current configuration data directly from the optical communication system and an up-to-date and reliable indication of the configuration of the optical communication system is thereby possible with the aid of the network management system. In the case of error, a localization of the error or, respectively, elimination of the error can be carried out promptly and, most of all, can be carried out without considerable outlay as a result thereof.

The inventive optical plug-type connection explained by means of the exemplary embodiments of FIGS. 1, 2 and 3 is not respectively limiting to the providing of exclusively flexible optical connecting conductors or optical connectors, but combinations of the function properties explained in the exemplary embodiments, particularly the combination of the flexible and the rigid connecting conductors, namely optical plug-type devices, can be provided in the network element NE.

Figure 4:
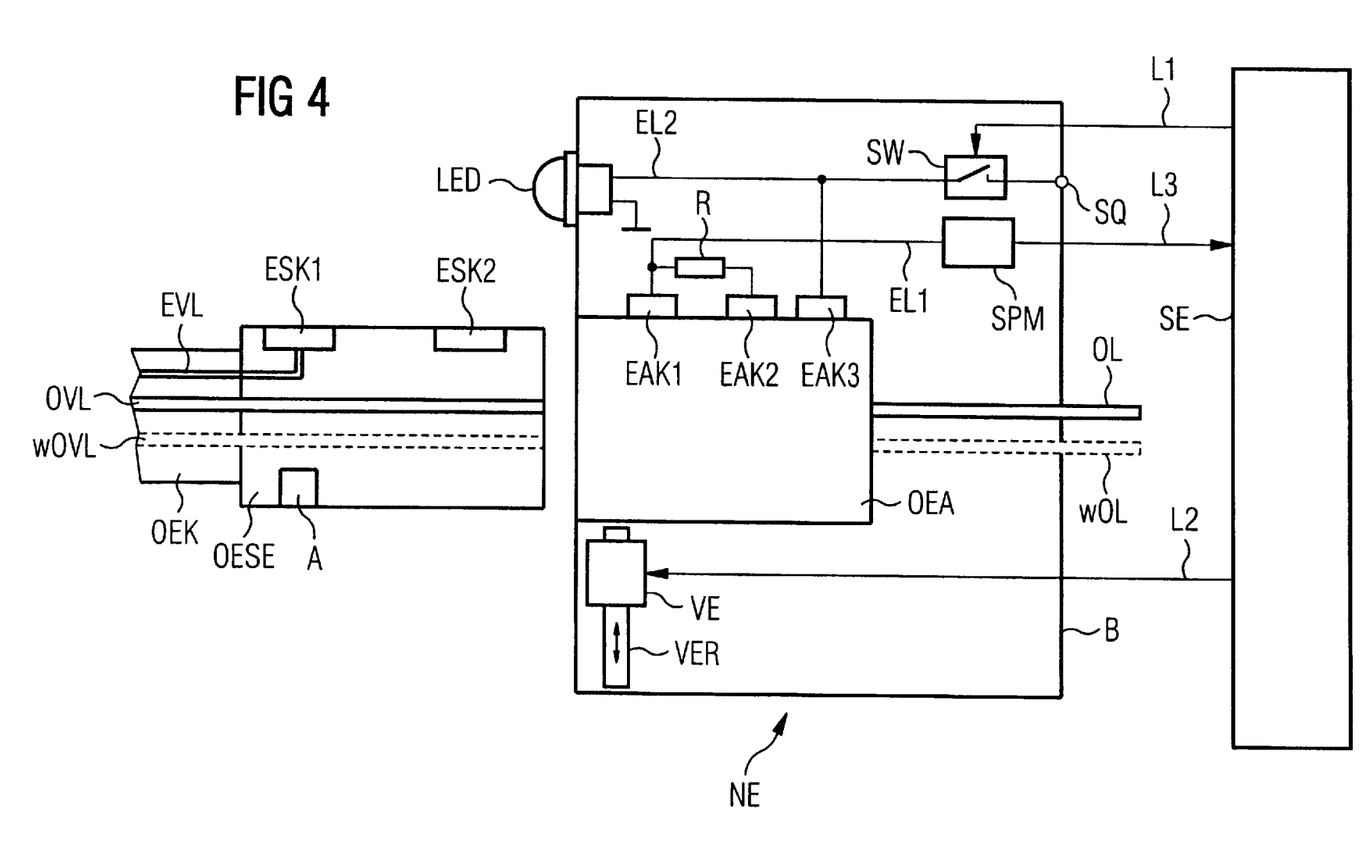
FIG. 4 is a schematic illustration of a preferred optical plug-type device in a released or unplugged condition.

An exemplary embodiment of an optical plug-type connection between an opto-electrical connecting cable OEK and a jack B of a network element NE is shown in FIG. 4 in an opened or uncoupled state. At one end, the opto-electrical connecting cable OEK has an opto-electrical plug element OESE that is composed of a first optical connecting conductor OVL, a second optical connecting conductor wOVL, an electrical connecting conductor EVL, two test contacts ESK1 and ESK2 and an acceptance device or recess A. The inventive jack B of the optical network element NE comprises an opto-electrical terminal OEA in the form of a socket, an illuminating display LED, a locking means VE, a first optical conductor OL, a second optical conductor wOL, two electrical conductors EL1 and EL2, test contacts EAK1, EAK2 and EAK3 and conductors L1–L3 for purposes of transmitting the configuration signals KS. The control unit SE is connected to a voltmeter SPM by means of the conductor L3. The voltmeter SPM is connected to two test contacts EAK1 and EAK2 by means of an electrical conductor EL1, whereby a resistor R is arranged between the test contacts EK1 and EK2. Over and above this, the illuminated display LED is connected to a voltage source SQ by means of an electrical conductor EL2 and a switch SW. The control unit SE, on one hand, is connected to the switch SW by means of the conductor L1 and, on the other hand, is connected to the locking means VE by the conductor L2.

Figure 5:
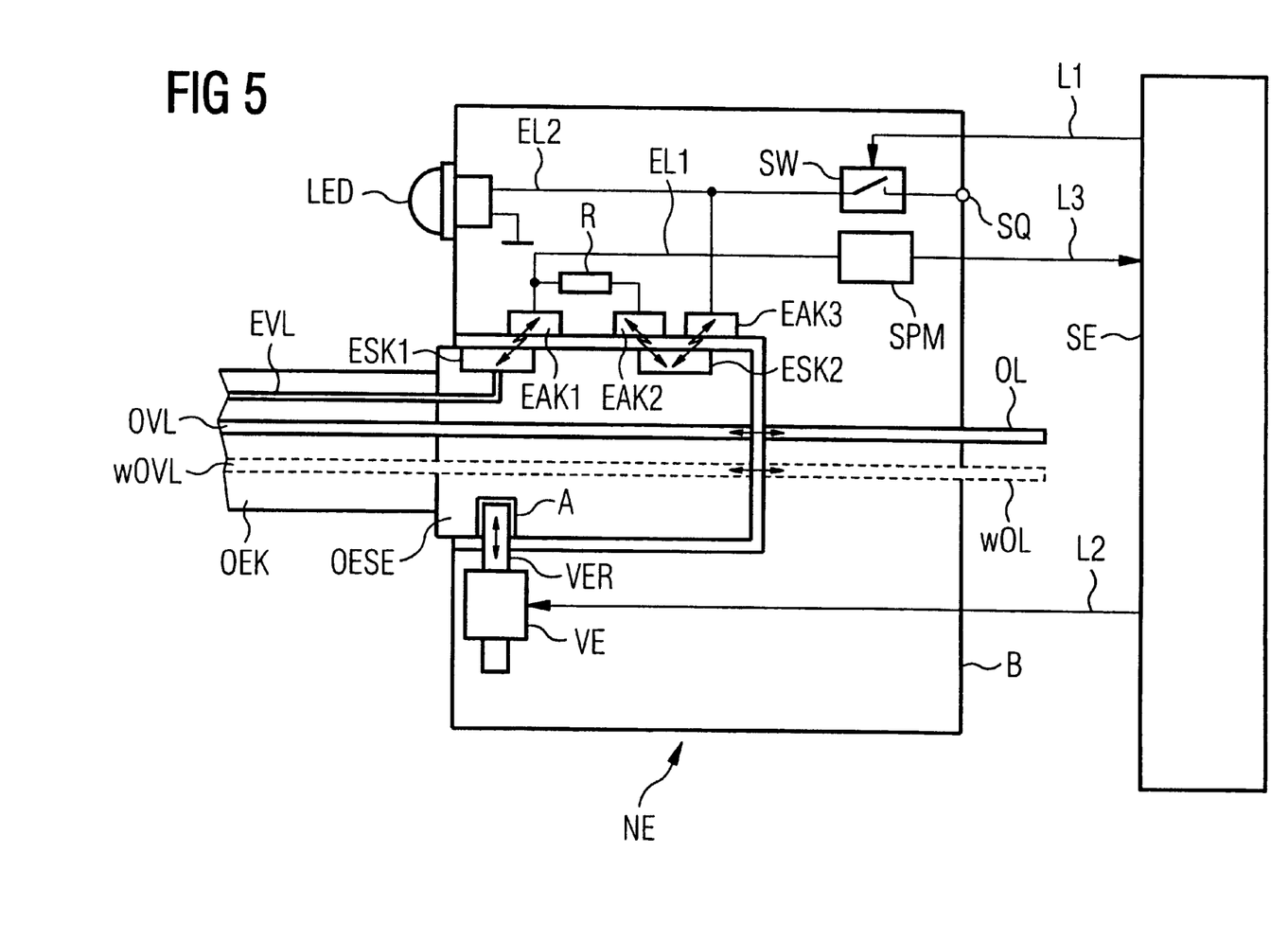
FIG. 5 is a diagrammatical view of the optical plug-type device of FIG. 4 in a connected or plugged-in state.

A plug-type connection between the opto-electrical connecting cable OEK and the jack B of the network NE is illustrated in FIG. 5. The opto-electrical plug element OESE of the connecting cable OEK is received in the socket OEA of the jack B of the network element NE so that the test contact ESK1 is connected to the test contact EAK1 and so that the test contact ESK2 is connected to the test contacts EAK2 and EAK3. In the plugged or connected state, the optical connection between the first optical connecting conductor OVL and the first optical conductor OL, as well as between the second optical connecting conductor wOVL and the second optical conductor wOL is created.

An opto-electrical conducting cable OEK is locked in the jack B of the network element by means of a plug process that is exemplarily shown in FIGS. 4 and 5. The locking unit VE is controlled via a central control unit SE. Given a plugged-in opto-electrical plug element OESE, the locking unit VE locks the opto-electrical terminal or socket OEA so that the opto-electrical plug element OESE can no longer be released. The locking occurs by means of a displacement of a locking bolt of a displacement element VER from an opened position to a closed position in which the locking bolt or, respectively, the bolt of the displacement element VER is displaced into the recess A of the opto-electrical plug element OESE to thereby lock the element in the jack B.

The inventive embodiment provides a visual-mechanical security system for purposes of creating or releasing an optical plug-type connection. The configuration state of the optical network element NE can be determined and controlled by means of the central control unit SE. Over and above this, a new erroneous configuration status can be avoided as a result of the inventive embodiment.

When a plugged optical plug-type connection is to be released, the central control unit SE closes the switch SW by means of a signal provided on the conductor L1, as a result whereof the illuminated display LED indicates the optical plug-type connection to be released. At the same time, the control unit SE transmits a signal via the conductor L2 to the locking unit VE, which unlocks the opto-electrical plug element OESE plugged in the jack B. Since a release of the opto-electrical plug element OESE is now possible, the electrical lines EL1 and EL2 that exist via the test contacts ESK1–ESK3 are interrupted. The voltmeter SPM displays a "zero level" and outputs a configuration signal KS via the conductor L3 to the central control unit SE. The central control unit SE now knows that the correct optical plug-type connection has been released and, therefore, opens the switch SW again by means of a signal along the conductor L1, as a result whereof the illuminated display LED is deactivated and, by means of the conductor L2, initiates the locking or closing of the opto-electrical terminal or socket OEA by means of the locking unit VE.

The process of forming the optical plug-type connection is analogous to the release of the optical plug-type connection. After the illuminated display LED has displayed the correct jack B to be used, the opto-electrical terminal or socket OEA is unlocked at the same time. The opto-electrical plug element OESE can now be introduced into the opto-electrical terminal or socket OEA; the voltmeter now displays a "one-level", as a result whereof the central control unit recognizes that the correct opto-electrical plug element OESE has been plugged into the correct opto-electrical terminal or socket OEA. The central control element SE makes the locking means VE lock the opto-electrical plug element OESE in the socket OEA and deactivates the illuminated display LED.

Figure 6:
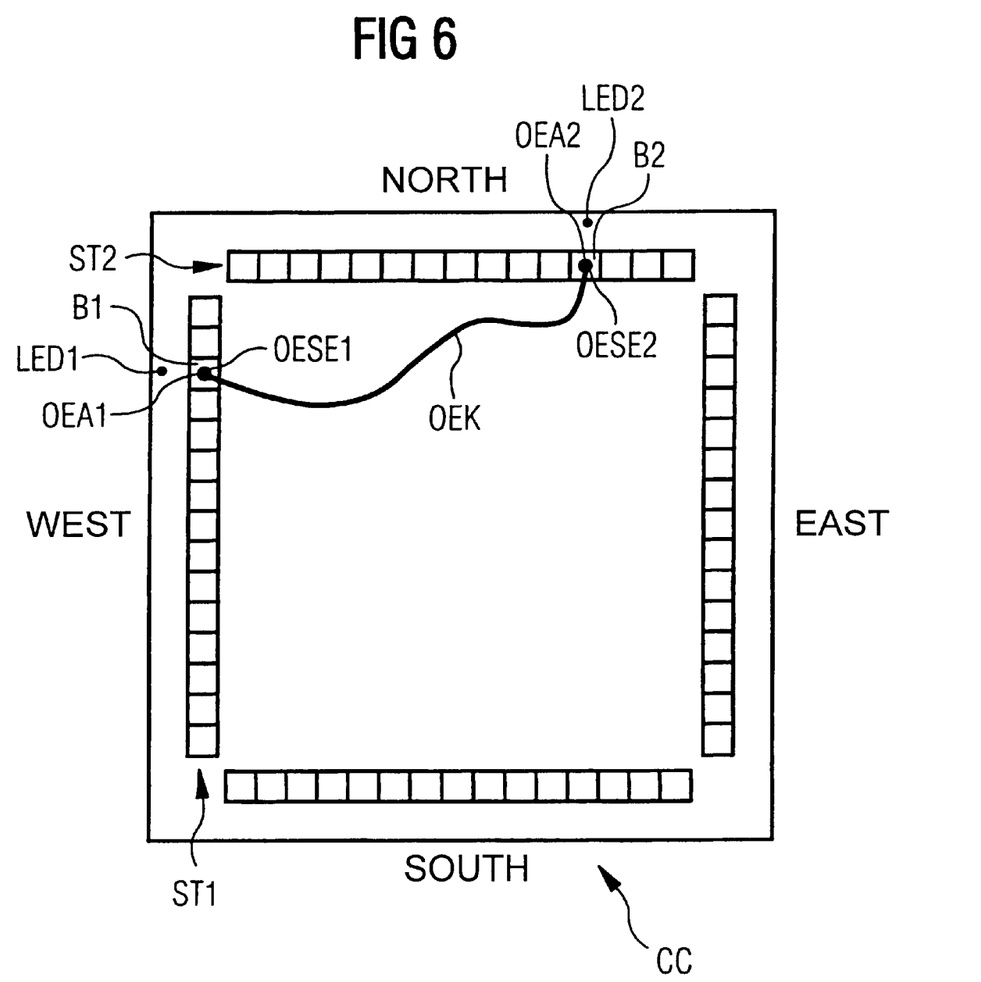
FIG. 6 is a plan view of a cross-connect with optical plug fields in accordance with the present invention.

A basic structure of a cross-connect CC with optical plug fields is shown in FIG. 6. An exemplary application of the inventive optical plug-type connections is the manual connecting of fields of an optical cross-connect CC by means of an opto-electrical connecting cable OEK. Plug fields, which are shown on each side of the square and are labeled "west", "north", "east" and "south", are exemplarily provided on the optical cross-connect CC. The plug fields, in turn, exhibit a linear succession of jacks B. A jack B1 of the west plug field ST1 is connected to a jack B2 of the north plug field ST2. The connection occurs by means of an opto-electrical connecting cable OEK, which has opto-electrical plug elements OESE1 and OESE2 at each end. The opto-electrical plug elements OESE1 and OESE2 are connected to the opto-electrical terminal OEA1 of the jack B1 in the west plug field ST1 and to the opto-electrical terminal OEA2 of the jack B2 in the north plug field ST2.

For purposes of creating or releasing the correct optical plug-type connection on the optical plug fields, the correct optical plug-type connections have to be marked and the plugging of incorrect optical connections prevented.

When an existing interconnection between two jacks B1 and B2 of the optical plug fields ST1 and ST2 is to be released on the optical plug fields of the cross-connect CC, the central control unit SE indicates the connection to be manually released by means of illuminated displays LED1 and LED2 and unlocks the opto-electrical terminals OEA1 and OEA2 of the jacks B1 and B2 by means of unlocking the locking means associated with each of the jacks B1 and B2. After the first opto-electrical plug element OESE1 has been pulled, the electrical line is interrupted via the test contacts, such as ESK1, ESK2 and EAK1–EAK3; the voltmeter SPM displays a "zero level". The central control unit SE registers that the correct plug has been pulled and deactivates the illuminated display LED1 and locks the opto-electrical terminal OEA1 again by means of the locking means, so that it is protected against erroneous plugging. Analogously thereto is the release of the second opto-electrical plug element OESE2 from the second opto-electrical terminal OEA2. The central control unit SE recognizes that the two correct optical plug-type connections have been released and goes back into its initial state. The central control unit is therefore ready for a new reconfiguration measure.

When two jacks B1 and B2 are to be connected to one another on the optical plug fields of the cross-connect CC, the central control unit SE indicates the jacks B1 and B2 of the optical plug fields to be manually connected by means of illuminated displays LED1 and LED2 and unlocks the opto-electrical terminals or sockets OEA1 and OEA2 of the respective jacks B1 and B2. An electrical contact is created via the test contacts ESK1, ESK2 and EAK1–EAK3 by means of plugging the first opto-electrical plug element OESE1 into the jack B1 and the voltmeter displays a "one level", so that the central control element SE will register that the opto-electrical plug element OESE1 has been plugged into the terminal or socket OEA1. The central control element will then lock the plugged optical connection by means of the locking means against any undesirable releasing and indicates an intermediate state by a blinking or flashing of the display LED1, for example. An electrical contact is created via the test contacts ESK1, ESK2 and EAK1–EAK3 and an optical connection is created due to the plugging of the second opto-electrical plug element OESE2 into the opto-electrical terminal or socket OEA2. As a result thereof, the voltmeter SPM displays a level between the "one-level" and the "zero level", which is caused in that an electrical connection is present via an electrical connecting line EVL in the opto-electrical connecting cable OEK to the first optical plug-type connection and a voltage falls off via the resistor R. The central control unit SE thereby recognizes that the first opto-electrical plug element OESE1 is connected to the second optical plug element OESE2 and it deactivates the illuminated displays LED1 and LED2 and locks the opto-electrical terminal OEA2 by means of the locking means.

Therefore, the invention provides an optical plug-type connection between two optical conductors respectively having optical terminals, whereby, in addition to the optical plug-type connection, an electrical connection is provided for purposes of verifying the optical plug-type connection. Therefore, the likelihood of an optical plug-type connection being erroneously acquired in the network management system is significantly reduced and the error localization is facilitated within the optical communication system.

Although various minor modifications may be suggested by those versed in the art, it should be understood that we wish to embody within the scope of the patent granted hereon all such modifications as reasonably and properly come within the scope of our contribution to the art.

We claim:

1. An optical plug-type connection between two optical conductors, each optical conductor having an optical terminal, said plug-type connection including an electrical connection being provided for verifying the formation of the optical plug-type connection so that the configuration of the optical plug-type connection is indicated in a control unit of an optical network element and a network management system with the aid of the electrical connection, said optical plug-type connection including locking means for locking an optical plug element and an electrical plug element in an opto-electrical terminal, said locking means being controlled by said control unit.

2. An optical plug-type connection according to claim 1, wherein the electrical connection is created and interrupted with the aid of an optical plug-type connection approximately at the same time.

3. An optical plug-type connection according to claim 1, wherein an electrical connecting conductor with plug elements is carried with an optical plug-type connection.

4. An optical plug-type connection according to claim 1, wherein an electrical conductor with cooperating plug elements is respectively carried with an optical conductor, which has optical plug-type connectors.

5. An optical plug-type connection according to claim 1, wherein the electrical connection between the electrical conductor is created by means of an electrical connecting conductor in the plugged status of the optical plug-type connection.

6. An optical plug-type connection according to claim 1, wherein means are provided for the purpose of transmitting a configuration signal via the electrical connection, whereby a transmitted configuration signal indicates a condition of the optical plug-type connection and actuates a display to show said condition.

7. An optical plug-type connection according to claim 6, which includes means for the line-oriented concentration of the configuration signals given at least one optical plug-type connection respectively connecting two optical conductors.

8. An optical plug-type connection according to claim 1, wherein the control unit acquires, stores and evaluates transmitted configuration signals and with at least one plug-type connection respectively connecting two optical conductors, said unit providing an indication of the status of said plug-type connections.

9. An optical plug-type connection according to claim 8, which includes means for a line-oriented concentration of the configuration signals given at least one optical plug-type connection respectively connecting two optical connectors.

10. An optical plug-type connection according to claim 1, wherein the optical connection is provided in a network element of an optical communication system.

11. An optical plug-type connection according to claim 1, which includes an illuminated display for a terminal receiving the plug-type connection for indicating the status of the connection.

12. A method for releasing and plugging an optical plug-type connection, said method comprising providing a plug-type connection having a terminal with locking means, releasing said locking means to enable plugging a connection into said terminal, and then sensing the plugged-in connection in said terminal and actuating the locking means to lock the plugged-in connection in said terminal, then deactivating the locking means to allow removal of the plugged-in connection from the terminal and then actuating the locking means to close the terminal and prevent further insertion of a plug-in connection.

13. A method according to claim 12, which includes providing an illuminated display and actuating said display to indicate the terminal for receiving the plugged-in connection and during the step of removing the connection, illuminating the display to indicate the terminal in which the plugged-in connection is to be removed.

* * * * *